United States Patent

Crowdy et al.

[11] 4,049,972
[45] Sept. 20, 1977

[54] TURBO-ALTERNATOR PLANT

[75] Inventors: Edmund Porter Crowdy, Newcastle-upon-Tyne; Hector Fillippus Alexander Drentham-Susman, Barton, both of England

[73] Assignee: Hawthorn Leslie (Engineers) Limited, Newcastle-upon-Tyne, England

[21] Appl. No.: 590,558

[22] Filed: June 26, 1975

[30] Foreign Application Priority Data

July 12, 1974 United Kingdom ............... 30962/74

[51] Int. Cl.² ....................... F01K 23/10; F01D 15/10
[52] U.S. Cl. ......................................... 290/52; 60/618
[58] Field of Search ............... 290/52, 1; 60/657, 618, 60/690, 692

[56] References Cited

U.S. PATENT DOCUMENTS 3,359,731  12/1967  Anderson ........................ 60/657

FOREIGN PATENT DOCUMENTS 1,012,744  12/1965  United Kingdom ............ 60/657
267,251  3/1927  United Kingdom ............ 60/657

OTHER PUBLICATIONS

Packing Glands for Large Steam Turbine Shafts, Power Plant Eng. Sept. 1, 1926, pp. 947-950.

*Primary Examiner*—Robert K. Schaefer
*Assistant Examiner*—John W. Redman
*Attorney, Agent, or Firm*—Larson, Taylor and Hinds

[57] ABSTRACT

A turbo-alternator plant, particularly for shipboard use on waste-heat generated steam, in which the turbine and alternator rotors are coupled directly together governed to a speed giving a desired frequency of a.c. output.

7 Claims, 1 Drawing Figure

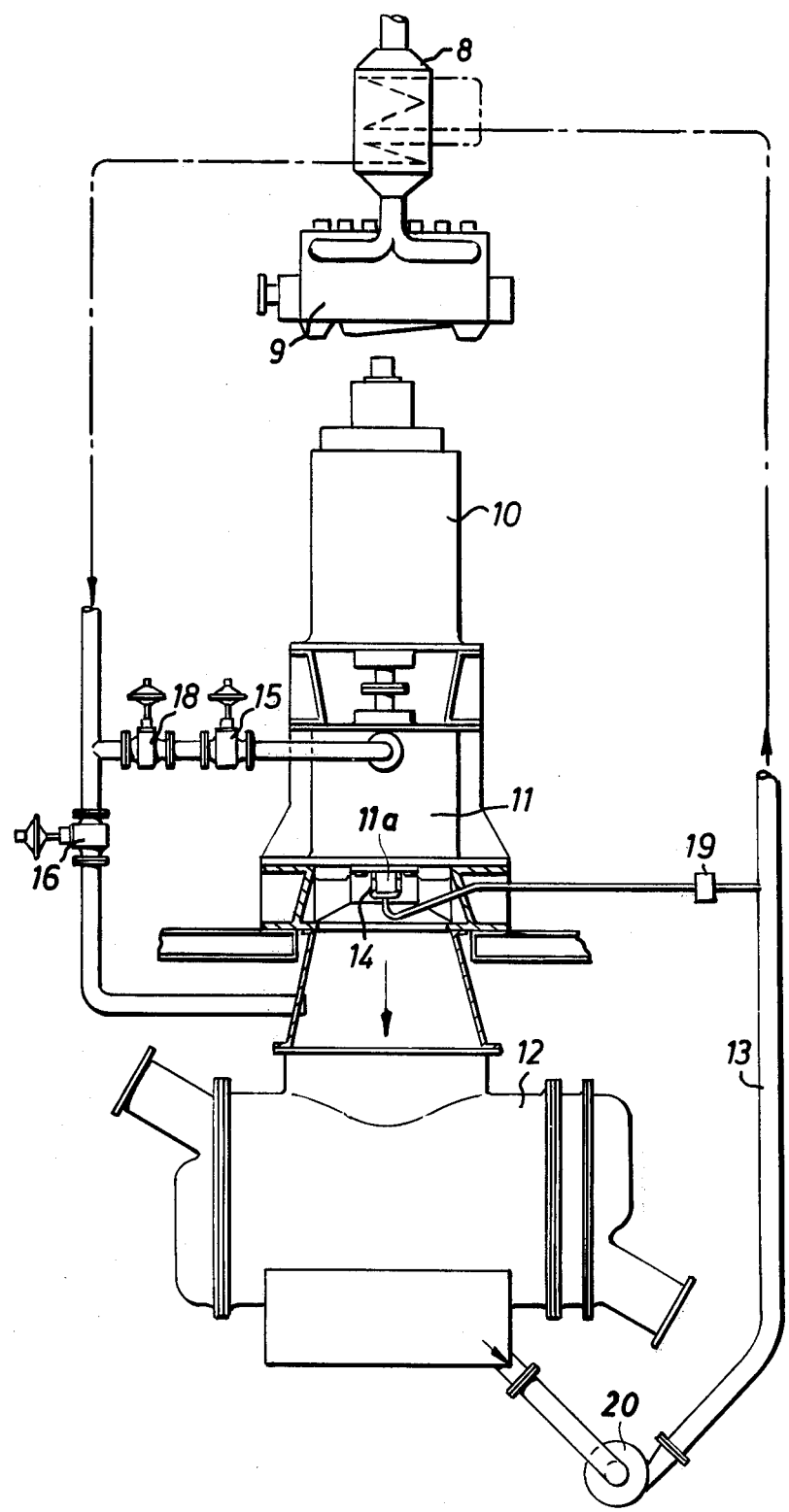

TURBO-ALTERNATOR PLANT

DESCRIPTION

This invention relates to turbo-alternator plant, such for example as may be employed in a ship for the generation of electricity to supply normal ship's requirements, the turbine being operated by steam generated in a waste heat boiler, the heat being derived for example from exhaust gas of a diesel engine or gas turbine, or other prime mover, such as may be used for ship propulsion. Such a turbo-alternator plant will be referred to as being of "the kind specified".

In conventional turbo-alternator plant of the kind specified, the turbine is a high speed machine rotating at above 8000 r.p.m. and driving the alternator at 1800 r.p.m. through reduction gearing. Although such conventional plant may use a small and simple turbine, the essential provision of a reduction gear inherently results in some loss of overall mechanical efficiency and in the need to provide an oil lubricating system for the machines. The axis of rotation of the machines is horizontal.

This invention provides a turbo-alternator plant of the kind specified in which the turbine and alternator are directly connected together and are disposed with the rotational axis of their rotors vertical, the alternator being above the turbine and the weight of their rotors being supported by a bearing within the environment of a condenser receiving steam exhausting from the turbine, and the rotor composite being governed to a speed appropriate to the desired frequency of the alternator output. Thus, in a plant suitable for ship's use, the plant may comprise a two-pole alternator and the rotating composite may be governed to run at 3600 r.p.m. so as to generate alternating current at 60 Hz which is the customary frequency for shipboard duty.

According to a feature of this invention, the alternator rotor may be stabilised transversely by two anti-friction, grease-lubricated bearings and the turbine rotor is stabilised by a water-lubricated bearing at its end remote from the alternator. Thus the need for a lubricating oil system is eliminated. Also the loads to which the anti-friction bearings are subjected are substantially reduced due to the rotational axis being vertical with the turbine below the alternator, so that these bearings act primarily as stabilising components. The weight-supporting bearing and the turbine-stabilising bearing may be combined in a journal and foot-step bearing which is feed water lubricated. Also the turbine outlet may be connected to deliver exhaust steam directly into the condenser so that the exhaust flow from the turbine is substantially unimpeded and good drainage secured.

The single FIGURE of drawing shows one construction of turbo-alternator plant, suitable for operation by waste-heat generated steam and suitable for use aboard ship.

The steam is generated in any convenient way by utilising residual heat in the exhaust from the ship's propulsion engines 9, e.g. diesel engines or gas turbines, the exhaust being passed through a waste heat boiler 8 to heat feed water.

The plant is as just described comprising a vertically-arranged alternator 10 of which the rotor is directly connected to and disposed above a turbine 11 mounted to exhaust directly into a subatmospheric condenser 12. Feed-water is tapped off from a pipe 13 which leads from the condenser 12 through an extraction cum feed pump 20 to the steam generating plant, e.g. the waste heat boiler 8, and the tapped-off feed water is utilised to lubricate a combined sleeve-type journal and foot-step bearing 14 supporting the downstream side of the turbine rotor shaft 11a. A fine filter 19 is included in the pipe leading to the bearing 14.

When the prime mover is operating above a certain minimum power level a significant amount of main engine exhaust gas heat is available for conversion into electrical power, and the control system is such that the turbo-alternator composite rotates at 3600 r.p.m. constantly.

The control system may include an electronic system for actuating steam valves of the turbo-alternator. These valves include a conventional throttle valve 15 which controls the flow of steam to the turbine and a steam by-pass valve 16 which controls the flow of any excess steam into the heat sink, shown as the condenser 12.

During the initial stages of plant operation, the by-pass valve 16 is fully shut. This valve is controlled to begin opening only when the system pressure reaches its operational maximum and the condenser pressure is below a specified minimum value. As steam is produced it passes through the turbine via the throttle valve 15 and warms up the power plant. As the pressure and temperature of the steam in the system increases then the energy contained in the steam increases and begins to spin-up the turbine rotor, and thereby the attached alternator rotor, under the surveillance of the speed governor. Upon reaching service speed an "alternator ready" signal will either initiate auto-synchronisation so that the turbo-alternator will produce electrical current in phase with the electricity being generated by other alternators already in use in the ship, or will be interpreted as a "go" condition for manual synchronisation of the current plase with that of other machines in use. Electrical load will then transfer progressively to the turbo-alternator from the other machines, so that when the steam production rate reaches the appropriate level all electrical load will be carried by the turbo-alternator.

Since in normal ship operation the total amount of electrical power which it is possible to generate from waste heat is in excess of the ship's normal electrical demands, the steam by-pass valve 16 will tend to be partially open so that excess steam is "dumped" continuously. To make full use of the maximum energy available from the main engine exhaust gas, the turbo-alternator plant may be arranged to deliver any excess electrical power which could be produced to duties other than those customarily associated with ship requirements. Since excess electrical power will be available only during periods of high power output from the main engine, the control system of the turbo-alternator plant need not be unduly complicated by introducing this third element into the control cascade. This control element will be required only during periods of stable main engine operation. Thus whenever main power is reduced below approximately 80% of maximum, the excess electrical power duty will be discontinued and control functions will be carried out by the two prime control elements, i.e. steam by-pass control and turbo-alternator speed control.

The plant is protected against an "overspeed" condition, due to any malfunction, by an electronically-controlled, quick-acting steam shut-off valve 18. The electronic control for "overspeed"protection is on a circuit separate from the other electronic control circuits.

We claim:

1. In a turbo-alternator plant comprising a prime mover producing hot exhaust gases, a waste heat boiler connected to receive the exhaust gases from the prime mover and thereby generating steam, a turbine receiving the steam to be driven thereby, an alternator, each of said turbine and said alternator having a rotor, the rotors being drivingly connected, and a steam condenser connected to receive steam exhausting from the turbine; the improvement, wherein the turbine rotor and alternator rotor are directly connected together and are disposed with the rotational axis of the said rotors vertical, the alternator being above the turbine and wherein there is a bearing arrangement supporting the said rotors including a bearing supporting the weight of their rotors, said bearing being within the environment of said condenser receiving steam exhausting from the turbine, and there being means governing the rotor composite to a speed appropriate to the desired frequency of the alternator output.

2. A turbo-alternator plant according to claim 1, wherein the alternator is a two-pole alternator.

3. A turbo-alternator plant according to claim 1, wherein the bearing arrangement comprises means stabilising the alternator rotor transversely, said means being two anti-friction grease-lubricated bearings, and the said bearing within the condenser environment also stablising the turbine rotor and being a water-lubricated bearing at the side of the turbine rotor remote from the alternator.

4. A turbo-alternator plant according to claim 3, wherein the weight-supporting bearing and turbine-stabilising bearing are combined in a journal and foot-step bearing which is water lubricated.

5. A turbo-alternator plant according to claim 4, comprising a source of supply of water for lubricating the foot-step bearing including a feed water return from the condenser to the waste heat boiler, and a pipe leading from the feed-water return to the foot-step bearing.

6. A turbo-alternator plant according to claim 1, wherein the steam outlet from the turbine is connected to deliver exhaust steam directly into the condenser so that the exhaust flow from the turbine is substantially unimpeded and good drainage secured.

7. A turbo-alternator according to any of claims 1, further comprising a throttle valve controlling the flow of steam to the turbine and a by-pass valve to lead any excess steam directly to a heat sink.

* * * * *